(12) United States Patent
Billiet et al.

(10) Patent No.: US 8,845,796 B2
(45) Date of Patent: Sep. 30, 2014

(54) FLUID SEPARATION DEVICE

(75) Inventors: Colin Billiet, Tyne and Wear (GB);
Brian Austin, Durham (GB)

(73) Assignee: Nano-Porous Solutions Limited,
Gateshead, Tyne and Wear (GB)

( * ) Notice: Subject to any disclaimer, the term of this patent is extended or adjusted under 35 U.S.C. 154(b) by 137 days.

(21) Appl. No.: 13/202,077

(22) PCT Filed: Feb. 22, 2010

(86) PCT No.: PCT/GB2010/050297
§ 371 (c)(1),
(2), (4) Date: Aug. 17, 2011

(87) PCT Pub. No.: WO2010/097614
PCT Pub. Date: Sep. 2, 2010

(65) Prior Publication Data
US 2011/0297478 A1  Dec. 8, 2011

(30) Foreign Application Priority Data

Feb. 27, 2009 (GB) .................................. 0903323.4
Oct. 26, 2009 (GB) .................................. 0918665.1

(51) Int. Cl.
*B01D 53/26* (2006.01)
*B01D 46/00* (2006.01)
*B01D 46/42* (2006.01)

(52) U.S. Cl.
CPC ............ *B01D 53/261* (2013.01); *B01D 53/266* (2013.01); *B01D 46/0031* (2013.01); *B01D 46/4236* (2013.01); *B01D 2259/402* (2013.01); *B01D 46/003* (2013.01); *B01D 2257/80* (2013.01); *B01D 46/0036* (2013.01); *Y10S 55/17* (2013.01)
USPC ................ 96/134; 96/142; 55/315.1; 55/318; 55/428.1; 55/DIG. 17

(58) Field of Classification Search
CPC .. B01D 53/261; B01D 53/266; B01D 46/003; B01D 46/0031; B01D 46/4236; B01D 46/0036; B01D 2257/80; B01D 2259/402
USPC ........ 96/121, 134, 142; 55/315.1, 318, 428.1, 55/DIG. 17
See application file for complete search history.

(56) References Cited

U.S. PATENT DOCUMENTS

| 4,231,768 A | 11/1980 | Seibert et al. |
| 4,318,717 A | 3/1982 | Sohier |

(Continued)

FOREIGN PATENT DOCUMENTS

| DE | 4228326 A1 | 3/1994 |
| EP | 0879627 A1 | 11/1998 |

(Continued)

OTHER PUBLICATIONS

International Search Report and Written Opinion received for corresponding PCT application No. PCT/GB2010/050297, mail date Sep. 15, 2010.

(Continued)

*Primary Examiner* — Frank Lawrence
(74) *Attorney, Agent, or Firm* — Wong, Cabello, Lutsch, Rutherford & Brucculeri, LLP.

(57) ABSTRACT

A fluid separation device (400) for separating water from a stream of compressed air, has a housing (402) defining a first volume (404) with two apertures (406, 408) therein in communication with the first volume, the first volume and the apertures being adapted to have a stream of air flowing there through, a first filter (414) contained within the first volume for separating liquid water from the air stream, and a plurality of desiccant beads contained within the first volume for separating water vapor from the air. An exhaust silencer for the fluid separation device is also disclosed.

9 Claims, 11 Drawing Sheets

(56) References Cited

U.S. PATENT DOCUMENTS

| | | | |
|---|---|---|---|
| 4,822,387 A * | 4/1989 | Daniels | 55/323 |
| 5,427,609 A * | 6/1995 | Zoglman et al. | 95/98 |
| 5,667,566 A | 9/1997 | Flynn et al. | |
| 6,951,581 B2 * | 10/2005 | Fornof et al. | 95/122 |
| 7,727,313 B2 * | 6/2010 | Blackwood et al. | 96/134 |
| 7,846,242 B2 * | 12/2010 | Paling et al. | 96/134 |
| 7,892,329 B2 * | 2/2011 | Milomo | 96/134 |
| 2007/0051612 A1 | 3/2007 | Herrera Orendain et al. | |
| 2007/0144350 A1 * | 6/2007 | Paling | 96/134 |

FOREIGN PATENT DOCUMENTS

| | | |
|---|---|---|
| EP | 1585584 A1 | 10/2005 |
| FR | 2539052 A1 | 7/1984 |
| GB | 1218627 A | 1/1971 |
| JP | 58027617 A | 2/1983 |
| WO | 0152973 A1 | 7/2001 |
| WO | WO 2006/123138 A1 * | 11/2006 |
| WO | 2009053760 A1 | 4/2009 |

OTHER PUBLICATIONS

Search Report received for corresponding Great Britian application No. GB 0903323.4, mail date Oct. 9, 2009.

* cited by examiner

FLUID SEPARATION DEVICE

CROSS-REFERENCE TO RELATED APPLICATIONS

This application is a National Stage entry from PCT Patent Application No. PCT/GB2010/050297 filed on 22 Feb. 2010, which claims priority to British Patent Application GB0903323.4 filed on 27 Feb. 2009, and British Patent Application GB0918665.1 filed on 26 Oct. 2009. The contents of each of these applications is hereby incorporated by reference in its entirety.

BACKGROUND OF THE INVENTION

1. Field of the Invention

The present invention relates to a fluid separation device for separating from a stream of a first fluid a second fluid, and relates particularly but not exclusively, to a fluid separation device for separating water from a stream of air.

2. Description of the Related Art

Compressed air is widely used in the dental, medical and laboratory based industries as a safe and reliable source of energy. However, the quality of the compressed air delivered by a compressor is unsuitable for use without treatment to improve its purity. Treating compressed air has generally involved filtering it, to remove oil/water aerosols and dirt, before drying it to remove water vapour. Both these processes result in a loss of compressed air pressure. This is generally compensated for by the compressor generating compressed air at a higher pressure than is actually required by the production process, which is energy inefficient.

Compressed air contains contaminants such as water, oil and particulate which must be removed before use. ISO8573.1 specifies air quality standards for these contaminants. The new compressed air treatment (CAT) system will produce air quality levels for humidity classes 4-6 (see table 1). Classifications for oil and particulates are determined by the filtration specified to meet any of the quality classes for oil and particulate. Humidity is expressed in terms of Pressure Dew Point ° C. (PDP) which is 'the temperature at which air is saturated with moisture, or in general the temperature at which gas is saturated with respect to a condensable component'. When the temperature or pressure of air reduces condensation will occur.

TABLE 1

ISO 8573-1, second edition 2001 Feb. 01.

| Humidity Class | Pressure Dew Point ≤ ° C. | CAT Equipment to achieve quality class |
|---|---|---|
| 1 | −70 | Desiccant dryer |
| 2 | −40 | Desiccant/membrane dryer |
| 3 | −20 | Desiccant/membrane dryer |
| 4 | +3 | Refrigeration dryer |
| 5 | +7 | Refrigeration dryer |
| 6 | +10 | Refrigeration dryer |

Compressed Air

Part 1

Contaminants and Purity Classes

Humidity

Significant numbers of small compressors (producing 50-4000 Liters/minute) are used for a wide variety of applications. Typically these small compressors are receiver mounted (meaning that they include a tank to store compressed air) and are not lubricated.

These compressed air systems use a dryer to remove water vapour and filtration to remove oil and particulates. The most significant contaminant in quantity is water vapour which is present in atmospheric air. As it is drawn into the compressor condensation of the water vapour occurs as the air is first compressed and subsequently cooled.

Desiccant adsorption dryers are used for high purity applications where PDP's of −70, −40 and −20° C. are required according to ISO8573.1 humidity classes 1, 2 and 3 respectively.

Adsorption is the process whereby specific molecules (the adsorbate) adhere to the surface of a highly porous solid (the adsorbent) by electrostatic and molecular forces. The adsorbent has a specific pore structure which will be a combination of larger or macro pores, slightly smaller pores or mesopores, or very small pores known as micro pores. The adsorbent is normally made into granules or beads which are used to form packed beds through which the adsorbate is passed and the process of adsorption can take place. The rate of adsorption is affected by many factors which ultimately determine the adsorption isotherm profile and thus the size of the packed bed.

Heatless desiccant dryers are most commonly used for drying compressed air to ISO classes 1, 2, 3 due to their simplicity and hence low cost. Such a heatless desiccant dryer is illustrated in FIG. 1 as a twin tower dryer 100, which operates by removing moisture through adsorption onto a granular desiccant bed 102, 108 from the feed air as it flows up through a packed bed of desiccant within respective columns 104 and 106.

The typical Twin Tower dryer 100 in FIG. 1 has two columns 104, 106 each respectively housing a packed bed of desiccant 102, 108. The Twin Tower dryer 100 uses four valves 114, 116, 118, 120 to control airflow alternatively through columns 104 and 106.

FIG. 1 illustrates the inlet valve 114 to column 104 to be open while the inlet valve 116 to column 106 is closed, also the exhaust valve 118 to column 104 is shown to be closed and the exhaust valve 120 to column 106 is open. This allows column 104 to be used to dry the air passing through it.

It is typical practice to equalise the pressure in both columns 104, 106 prior to switch over for two reasons. This prevent shocking the desiccant beds 102, 108 which may lead to the desiccant breaking down into powder, and prevents pressure dips in the outlet air flow. On change over valve 118 opens allowing rapid decompression to occur in the used column 104 and water previously adsorbed by the desiccant bed 102 is blown out of the column 104 through valve 118.

Column 106 having been previously used in drying the inlet air, and also housing a granular desiccant bed 108, is at atmospheric pressure when valve 120 is opened, and dry purge air from the outlet of column 104 is fed through a control orifice 110, expanded to near atmospheric pressure, and flowed in contra flow direction down through column 106 to effect the regeneration of its granular desiccant bed 108 by desorbing water previously adsorbed by the desiccant bed 108 out of column 106 through exhaust valve 120. The purge air having been dried by the desiccant and reduced in pressure has an increased capacity to desorb water from the desiccant bed.

When the desiccant in column 104 becomes partially saturated with water vapour (usually determined by a simple timer controller) the feed air is switched back to column 106, after it has been pressurised, by closing valve 120 to allow pressure equalisation of the columns 104, 106 before opening valves 116, 118 and closing valve 114, also control orifice 112 comes into use, thereby allowing the air drying cycle to continue.

FIG. 2 shows a Twin Tower dryer 200, where all components identical to the dryer in FIG. 1 have been labelled with like reference numerals increased by 100. Twin tower dryer 200 has an alternative valving arrangement to that in FIG. 1, which is more commonly used in smaller systems in which the inlet valve 222 is a shuttle type. The shuttle is operated through the control of the exhaust valves 218, 220.

FIG. 3 shows a Twin Tower dryer 300, where all components identical to the dryer in FIG. 1 have been labelled with like reference numerals increased by 200. Twin Tower dryer 300 has a further alternative valving arrangement to that illustrated in FIG. 1, where the inlet valving 324 is a 5/2 valve. While this arrangement has cost benefits it has a number of disadvantages.

Re-pressurisation of the columns is not possible as it results in pressure dipping in the outlet flow on change over between columns. The columns 304, 306 cannot be held at pressure when the compressor is off load. The columns 304, 306 (one at least) cannot be closed to the atmosphere when operation is ceased. Pressure losses may also be high.

Note that the components labelled 107, 207, 307 in FIGS. 1 to 3 respectively are non-return valves.

Compressed air is discharged from a compressor at high temperature and must be cooled before entering a desiccant dryer. This is typically done by an air cooled after-cooler which reduces the air temperature to between 5-10° C. above ambient air temperature. Such cooling causes the formation of liquid water condensate in the air flow which must be removed by a filtration device.

In small receiver mounted compressor systems this volume of water so separated from an air flow must be either piped to drain or collected in a suitable container for periodic disposal (typically daily). Removal of this condensate is essential to maintaining dryer performance.

Filtration is also used to remove oil, water in aerosol and liquid form, and solid particles.

External inlet filters 103, 203, 303 are used in the systems illustrated in FIGS. 1 to 3 respectively, for the removal of oil and water in aerosol and liquid form. This is necessary to protect any drying stages which may subsequently be prevented from becoming fouled and overloaded. External outlet filters 105, 205, 305 are also used in the systems illustrated in FIGS. 1 to 3 respectively, to remove particulate carry over (desiccant dust) from such a drying stage.

Filters generally consist of a housing and replaceable filter element which is replaced when pressure losses increase as contamination removed blocks the flow of air through the filter element resulting in increased pressure losses.

Inlet filtration is commonly used prior to drying on a compressor. Typically compressed air is cooled by a compressor after cooler to typically 35° C. where condensation occurs resulting in the air being saturated with water vapour.

With reference to FIG. 1, inlet filters 103 are used to remove contaminants which, if allowed to enter the dryer columns 104, 106, will either degrade the adsorbent material 102, 108 or affect its ability to produce a desired dew-point (dryness). One or two inlet filters 103 are typically used to remove bulk liquid and aerosols immediately prior to the adsorption dryer inlet 114.

Automatic drains are used to remove separated liquids as they collect in the inlet filter 103 housings. The reliability of automatic drains when they are used is important since any failure to operate will result in bulk liquid carryover causing significant damage to adsorbent beds 102, 108 which will require complete replacement.

Desiccant materials 102, 108 are supplied in granular form and due to handling and movement within the column 104, 106 during normal use suffer from attrition generating dust which will contaminate the outlet air flow.

It is necessary therefore to use further filters 105 to remove the dust preventing contamination of the outlet air as it comes into contact with downstream equipment and processes.

The filters 103, 105 have replacement elements which are typically recommended to be changed annually as pressure drop increases. In addition the pressure loss from the housings and associated connecting pipe work is significant and may account for up to 700 mbar in total. This represents a considerable loss of energy and system pressure. Failure to replace filter elements is common and leads to reduced performance and failure to maintain dew point.

In air drying systems a compressor typically charges a receiver (a tank for storing pressurised air) to a predetermined pressure e.g. 8 bar, before closing down.

Such a compressor is not normally designed for continuous running and is only (by stop/starting) used periodically to replace the air which has been used by the application. The stored air is available for use by the application and gradually reduces in pressure to typically 6 bar at which point the compressor is restarted, building the air pressure back up to 8 bar and so on.

When the compressor is stopped, the pressure within the compressor and associated pipe work up to the receiver, into which the outlet air in FIGS. 1 to 3 is pumped, is released allowing the compressor to restart against atmospheric pressure only. The receiver pressure is maintained by way of a non return valve (NRV) fitted to the receiver. Typically the pressure in the Twin Tower dryers 100, 200, 300 in FIGS. 1 to 3 would also be vented to atmospheric pressure, or alternatively an external NRV would need to be fitted.

It should be noted that in the case of the valve arrangement shown in FIG. 3, it is not possible to maintain pressure in the Twin Tower dryer 300 since, by design, one port of the 5/2 valve is always open to atmosphere. This has an added disadvantage of allowing atmospheric water vapour to contaminate one of the columns leading to poor drying performance on resumption of duty. The adsorbent bed is also subjected to shock loading as re-pressurisation is not possible during normal column cycling. Additionally the bed is subject to over flow every time the compressor restarts and has to build up pressure in the receiver.

Preferred embodiments of the present invention seek to overcome the above disadvantages of the prior art.

According to an aspect of the present invention there is provided a fluid separation device for separating from a stream of a first fluid a second fluid, the device comprising: a housing defining a first volume, said housing having at least one first aperture in communication with said first volume, said first volume and said first aperture adapted to have at least one stream of at least one first fluid flowing therethrough; at least one first filter contained at least partially within said first volume for separating at least one impurity from said fluid stream; and at least one fluid separation medium contained at least partially within said first volume for separating at least one second fluid from said first fluid.

Because the filter and fluid separation medium are both within a single housing, this ensures that only a single fluid purifying component need be installed into a system requiring the purification of fluid e.g. a compressed air system. In such a compressed air system, due to the presence of the filter within the housing, no external inlet separation device is required to remove liquid condensate from air before it flows into the fluid separation medium which removes water vapour from such air. Furthermore due to the presence of the filter within the housing, built in outlet filtration may be achieved which eliminates the need for an external outlet filter and the associated cost and pressure losses. The advantage is therefore provided of increasing the ease with which a fluid purifying device may be installed into a system requiring the purification of a fluid.

In systems using a fluid separation medium, it is common to pump a fluid back through the fluid separation medium to remove any unwanted fluid so removed from a fluid initially pumped into the system, so as to de-saturate and regenerate the fluid separation medium such that it can be used again.

In the fluid separation device of the present invention, because the filter and fluid separation medium are both within a single housing, when fluid is pumped back through the fluid separation medium, fluid is simultaneously and with no loss in pressure pumped back through the filter, which may be either an inlet or an outlet filter, thereby simultaneously regenerating both the filter and fluid separation medium. This provides the advantage of increasing the life span of and decreasing the pressure losses due to, a filter, by removing impurities caught in the filter, so removed from fluid input into the system.

Another advantage provided by the fact that the filter and fluid separation medium are both within a single housing or cartridge is that it is easier to replace the filter and fluid separation medium in a system requiring the purification of a fluid, by simply removing the cartridges from the system and inserting new ones. Such a cartridge may be adapted to slot into and out of such a system, thereby providing the advantage of further increasing the ease of replacing perishable components in a system requiring fluid purification.

In a preferred embodiment said first filter is adapted to at least partially engage said first aperture.

The fluid separation device may further comprise: at least one second aperture in said housing in communication with said first volume within said housing; and at least one second filter contained at least partially within said first volume for separating at least one impurity from said fluid stream.

In a further preferred embodiment the second filter is located adjacent said second aperture.

The fluid separation device may further comprise: heat generating means for heating at least one body portion; and impurity transfer means for transferring said impurity so separated from said fluid stream to said heat generating means in order to evaporate said impurity back to atmosphere.

In another preferred embodiment the fluid separation device further comprises at least one vessel for collecting said impurity so separated from said fluid stream.

In a further preferred embodiment the heat generation means is an electric heater.

In a preferred embodiment the fluid separation device further comprises at least one fan for blowing said evaporated impurity into the atmosphere.

According to another aspect of the present invention there is provided a removable cartridge for use in a pressurized air drying system, the cartridge comprising any of the features of the previously described fluid separation device, wherein said cartridge is adapted to remove water from air input into the cartridge from said pressurized air drying system.

The cartridge reduces and simplifies servicing of such an air drying system and eliminates the need for special tools to replace desiccant when it is loaded directly into the pressure housing. Furthermore, it guarantees fluid separation media integrity and performance.

According to a further aspect of the present invention there is provided a valve comprising: a housing defining a first volume, said housing having at least three apertures adapted to act as inlets and/or outlets for transfer of fluid, said apertures being in communication with said first volume; and aperture blocking means for substantially preventing fluid flow through at least one said aperture and substantially allowing fluid transfer between said other apertures.

Such a valve may self act as a non-return valve, thereby providing the advantage of eliminating the need to include a non-return valve upstream from such a valve.

In a preferred embodiment said blocking means comprises at least one movable body portion.

In another preferred embodiment a pressure differential between said first volume and at least one aperture induces a force on said movable body portion.

This provides the advantage of being able to externally configure such a valve's configuration.

In a further preferred embodiment said movable body portion is located at least partially within said first volume defined by said housing.

In a preferred embodiment said movable body portion has a shape complimentary to that of at least one said aperture. In another preferred embodiment said movable body portion has a substantially spherical shape.

In a further preferred embodiment one said aperture is adapted to provide an inlet for transfer of fluid into said first volume, and two said apertures are adapted to act as outlets for transfer of fluid out of said first volume.

In a preferred embodiment said valve further comprises at least one receiving portion for at least partially engaging said aperture blocking means.

According to another aspect of the present invention there is provided a fluid disposal device comprising: at least one filter for separating water from a gaseous stream; heat generating means for heating at least one body portion; water transfer means for transferring water from said at least one said filter to said heat generating means in order to evaporate said water back to atmosphere.

This provides the advantage of eliminating the need for additional piping to pipe away unwanted water to a suitable drain or collection device used to store such water for subsequent disposal which is also eliminated.

In a preferred embodiment said fluid disposal device further comprises at least one vessel for collecting said water so separated from said gaseous stream.

In another preferred embodiment said heat generation means is an electric heater.

In a further preferred embodiment said fluid disposal device further comprises at least one fan for blowing the evaporated water into the atmosphere.

According to a further aspect of the present invention there is provided a separation device for separating at least one liquid from a stream of gas, the device comprising: a first body portion defining at least one first volume; a second body portion defining at least one second volume; fluid transfer means for transferring fluid from said first volume to said second volume and for increasing a velocity of said fluid during said transfer; and liquid catching means, located adjacent said fluid transfer means, for catching droplets of liquid; wherein: said fluid moves in a first direction on exiting said fluid transfer means and then slows down and moves in a second direction, different from said first direction, as it passes into said second volume; and said catching means is located in line with said first direction.

Such a separation device efficiently separates liquid water from a stream of air without restricting the flow of air thereby providing the advantage of minimizing the pressure loss incurred by air during the liquid water separation process as the catching means collects water. The catching means retains liquid water so separated from a stream of air and removes separated liquid water into a disposal region thereby providing the advantage of increasing the efficiency of the liquid water separation process.

In a preferred embodiment said first body portion has at least two apertures in communication with said first volume, and said second body portion has at least one aperture in communication with said second volume.

In another preferred embodiment said first volume is annular.

This allows air to easily circulate within the first volume such that its velocity increases to its maximum value before exiting the first volume, thereby providing the advantage of increasing the efficiency with which liquid water can be removed from a stream of air.

In a further preferred embodiment said second volume is cylindrical.

In a preferred embodiment said second volume is located at least partially within said first volume.

In another preferred embodiment said fluid passes, at least partially, through said liquid catching means from exiting said fluid transfer means and entering said second volume.

This provides the advantage of increasing the efficiency with which liquid water may be separated from air at the expense of the slight disadvantage of increasing the pressure loss incurred by air during the liquid water removal process.

In a further preferred embodiment said liquid catching means comprises a porous body.

In another preferred embodiment said porous body comprises at least one mesh.

In another preferred embodiment, said separation device further comprises at least one vessel for receiving liquid separated from said stream of gas.

According to another aspect of the present invention there is provided a fluid disposal device as described above, wherein said filter for separating water from a gaseous stream comprises a separation device also as described above.

According to a further aspect of the present invention there is provided an exhaust silencer for a fluid separation device, comprising: a first body portion defining a first volume having at least one first and at least one second aperture therein; at least one second body portion defining a second volume and having at least one input to receive at least one moving fluid, the second volume being in fluid communication with the first volume via the second aperture, wherein: the fluid moves in a first direction on passing from the second volume to the first volume through the second aperture, slows down and moves in a second direction, different from the first direction, as it passes through the first volume into the atmosphere via the first aperture.

The change in direction of fluid within the exhaust silencer causes the fluid (a mixture of air and water vapour and droplets) to slow down and reflects noise back towards its source within the exhaust silencer as it does so. This provides the advantage of minimising the noise produced by fluid as it exits the exhaust silencer and enters the atmosphere. Furthermore, because the jet of air and water has slowed it does not blast into the atmosphere or against surfaces adjacent to the exhaust thereby protecting them from the slightly acidic water from the dryer.

In a preferred embodiment the exhaust silencer further comprises at least one third body portion defining a third volume for allowing fluid to flow therethrough.

Causing hot air from a compressor to flow through the third volume allows heat produced by the compressor to be used to evaporate liquid water from within the exhaust silencer without the requirement of an additional heat source. This provides the advantages of minimising cost and energy expenditure.

In another preferred embodiment an external surface of the third body portion, corresponding to an internal surface of the first body portion, is at least partially ribbed.

Such a ribbed surface provides the advantage of maximising the efficiency of heat energy transfer from within the third volume to liquid water within the first volume.

In a further preferred embodiment the exhaust silencer is made of at least one metal.

Use of such a thermally conductive material provides the advantage of maximising the efficiency of heat energy transfer from within the third volume to liquid water within the first volume.

In another preferred embodiment the exhaust silencer is made of aluminium. The use of aluminium provides the advantage of good corrosion resistance from condensate produced by a compressor which for none lubricated compressors is slightly acidic, typically pH 5.7.

BRIEF DESCRIPTION OF THE DRAWING FIGURES

Preferred embodiments of the invention will now be described, by way of example only and not in any limitative sense, with reference to the accompanying drawings in which.

DETAILED DESCRIPTION OF THE INVENTION

Figure 1:
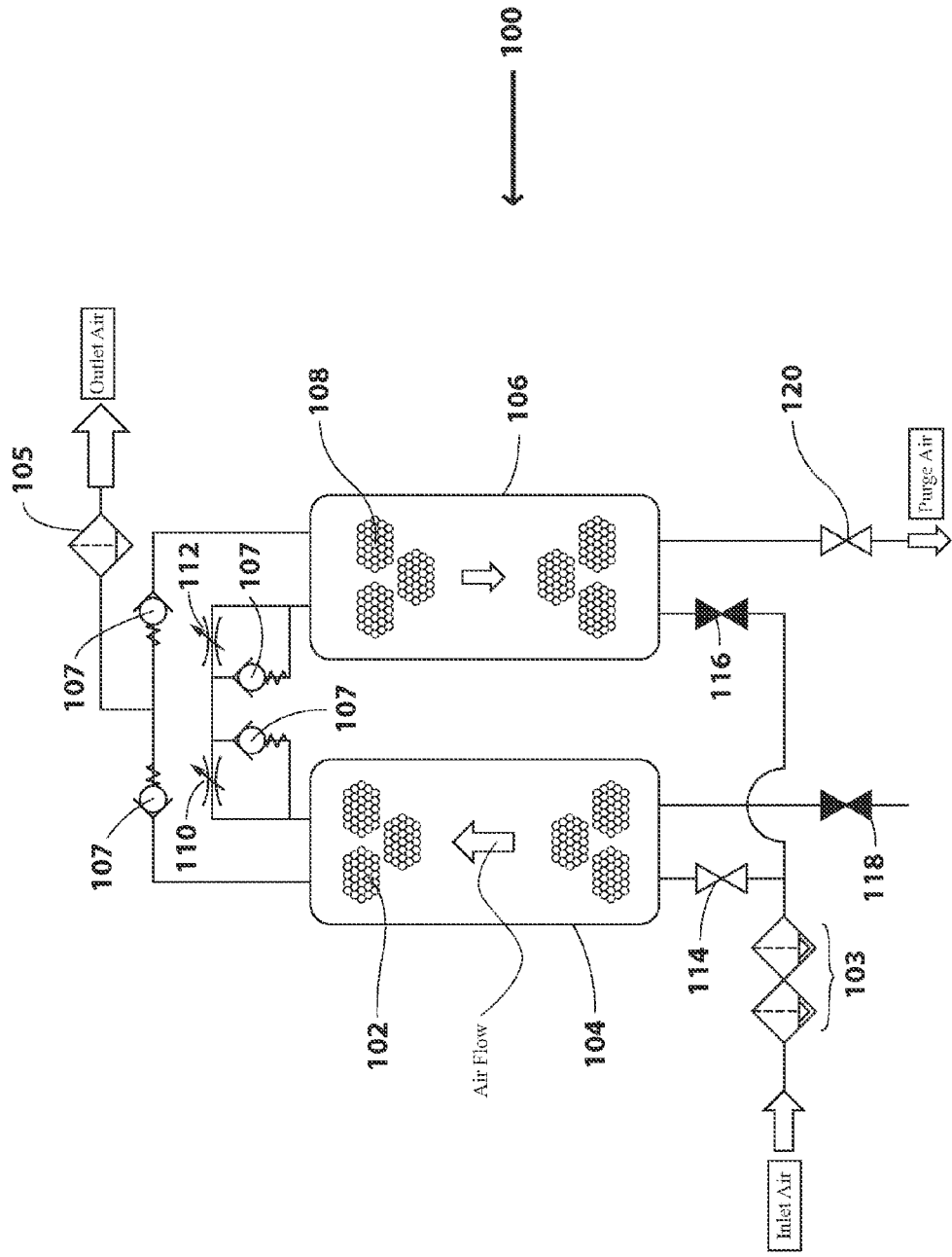
FIG. 1 is a schematic diagram of a first Twin Tower compressed air drying system of the prior art.
Figure 2:
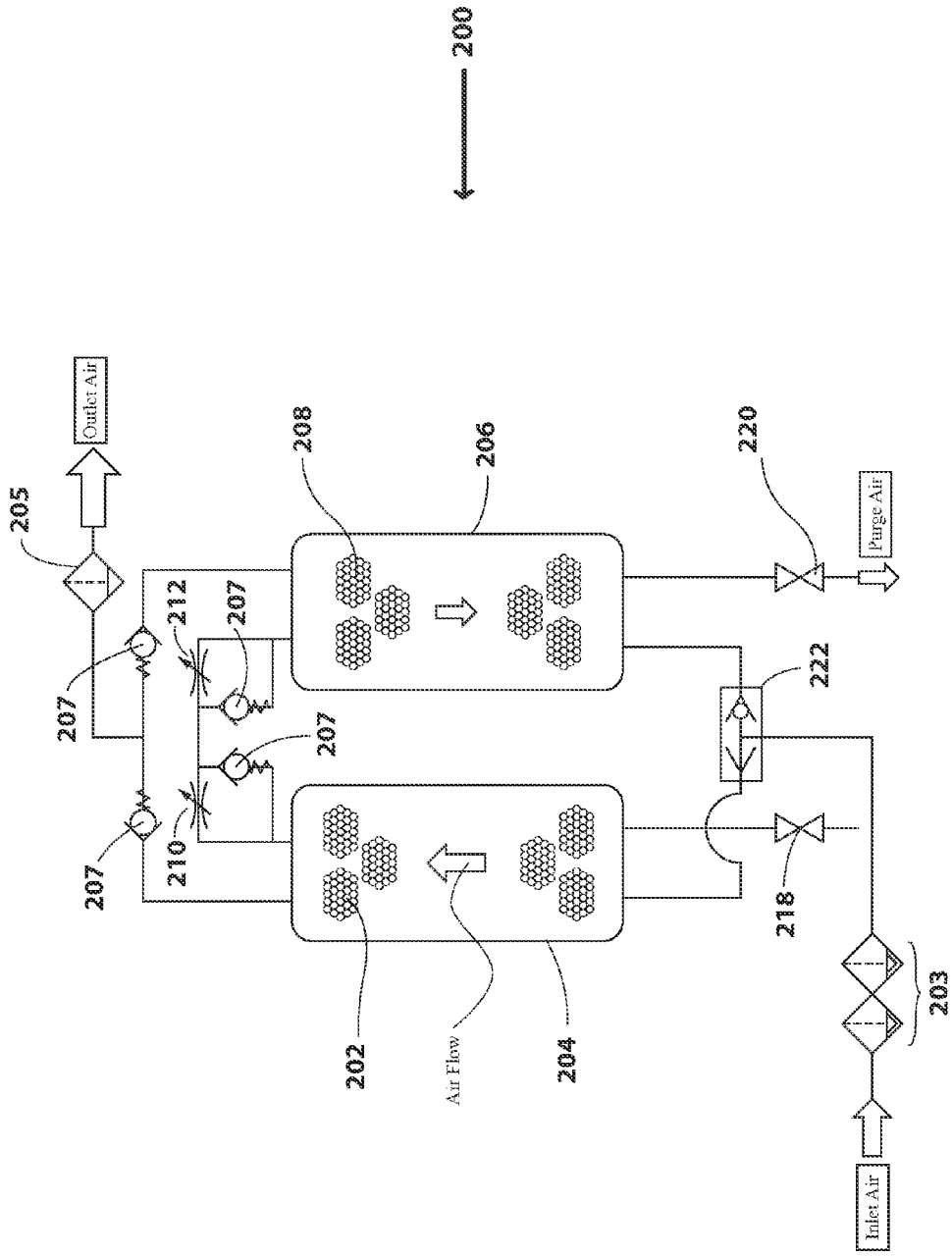
FIG. 2 is a schematic diagram of a second Twin Tower compressed air drying system of the prior art.
Figure 3:
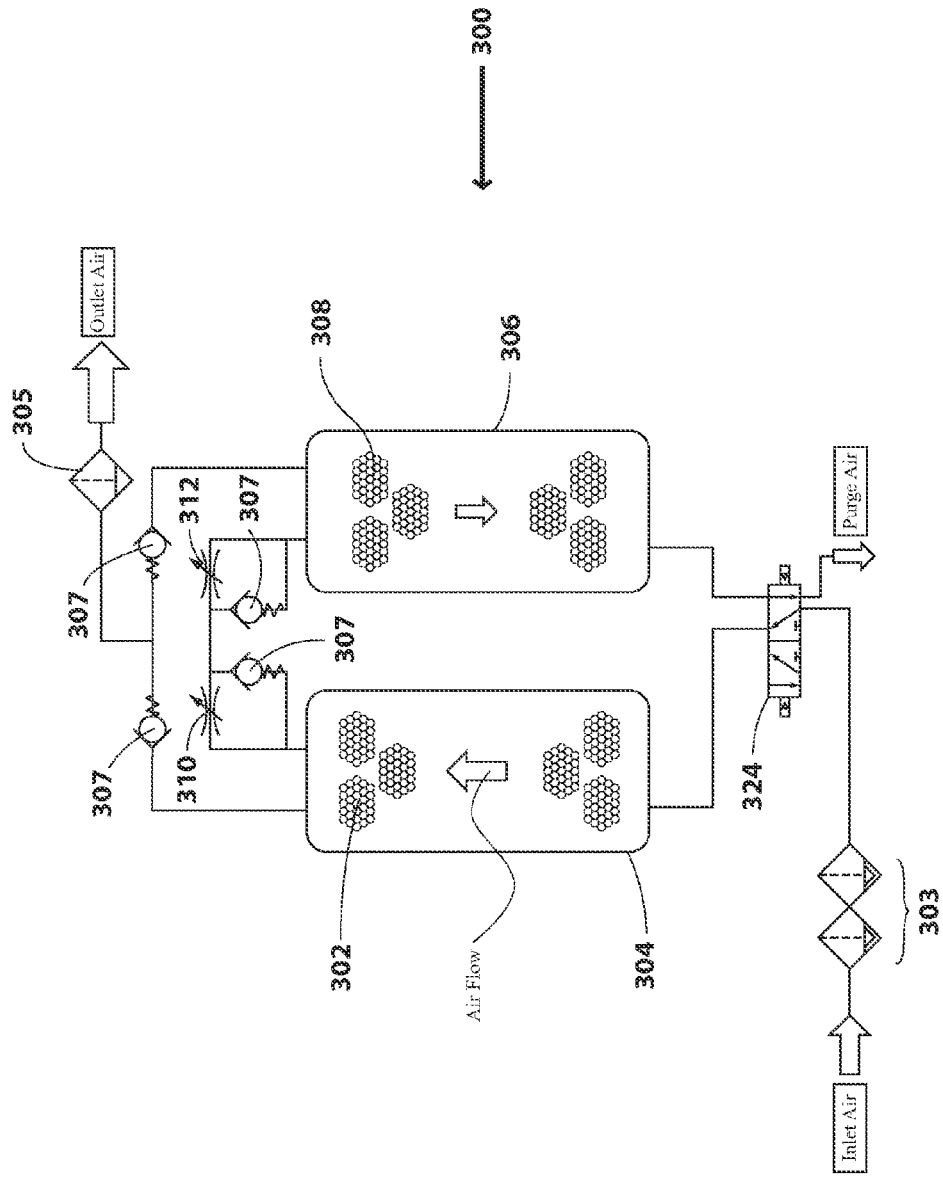
FIG. 3 is a schematic diagram of a third Twin Tower compressed air drying system of the prior art.
Figure 4:
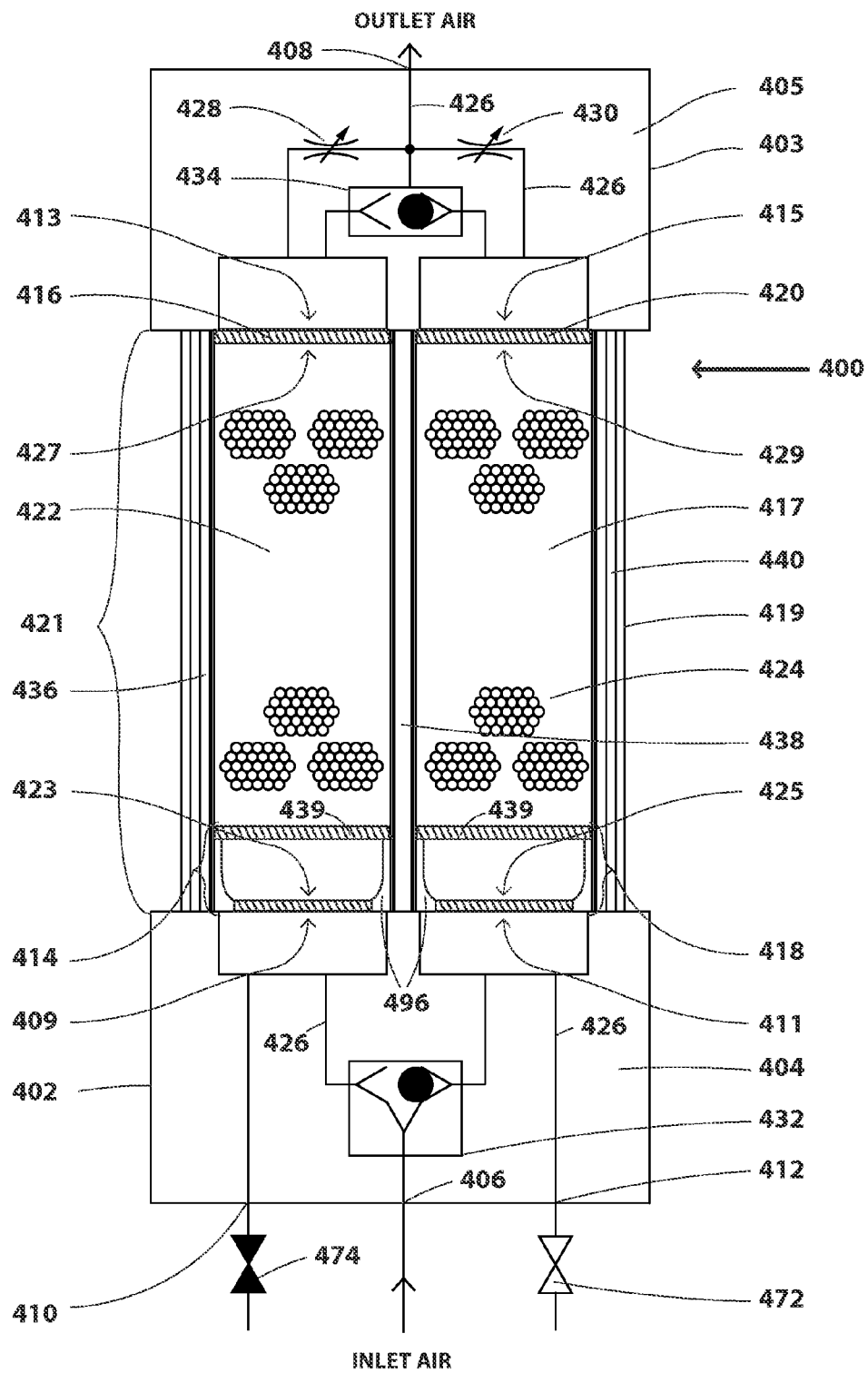
FIG. 4 is a schematic diagram of a fluid separation device of the present invention.
Figure 5:
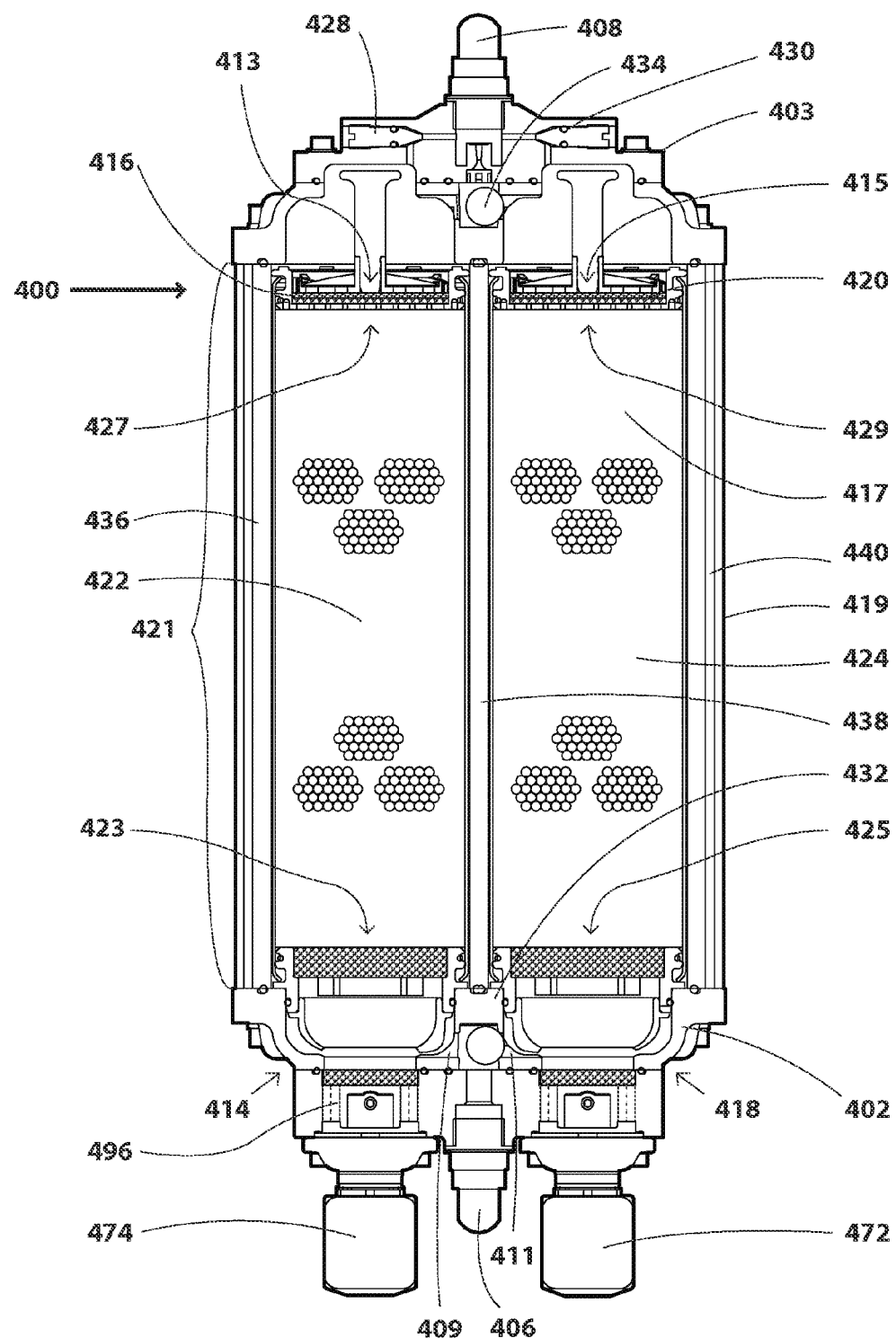
FIG. 5 is a sectional view of a fluid separation device of the present invention.

Referring to FIG. 4 a fluid separation device 400 has two housing portions 402, 403 defining first and second volumes 404, 405 respectively. The first housing portion 402 has five apertures in communication with the first volume 404, namely inlet aperture 406, first and second purge air outlets 410, 412 and first and second cartridge outlets 409, 411. The second housing 403 has three apertures in communication with the second volume 405, namely outlet aperture 408 and third and fourth cartridge outlets 413, 415.

The first and second volumes 404, 405 are connected by a third volume 417 defined by the housing 419 of a drying cartridge 421. The housing 419 of the drying cartridge 421 has first, second, third and forth cartridge apertures 423, 425, 427, 429 which are adapted to respectively communicate with first, second, third and forth cartridge outlets 409, 411, 413, 415. The cartridge 421 contains four filters 414, 416 and 418, 420 which are respectively connected by drying columns 422, 424 each housing a packed bed of desiccant beads.

The first, second and third volumes 404, 405, 417 are adapted to have a stream of air flowing therethrough, and the filters 414, 416, 418, 420 are adapted to separate impurities e.g. liquid water and solid particulate, from such a stream of air, and the drying columns 422, 424 are adapted to remove water vapour from the stream of air.

The fluid drying device 400 also has a system of piping 426, control orifices 428, 430 and inlet and outlet valves 432, 434 connected in the arrangement so illustrated in FIG. 4.

Blocking portions 436, 438, 440 are adapted to prevent the flow of air there through and thereby cause air flowing through the third volume 417 within the cartridge 421 to flow through filters 414, 416, 418, 420 and drying columns 422, 242.

Figure 6:
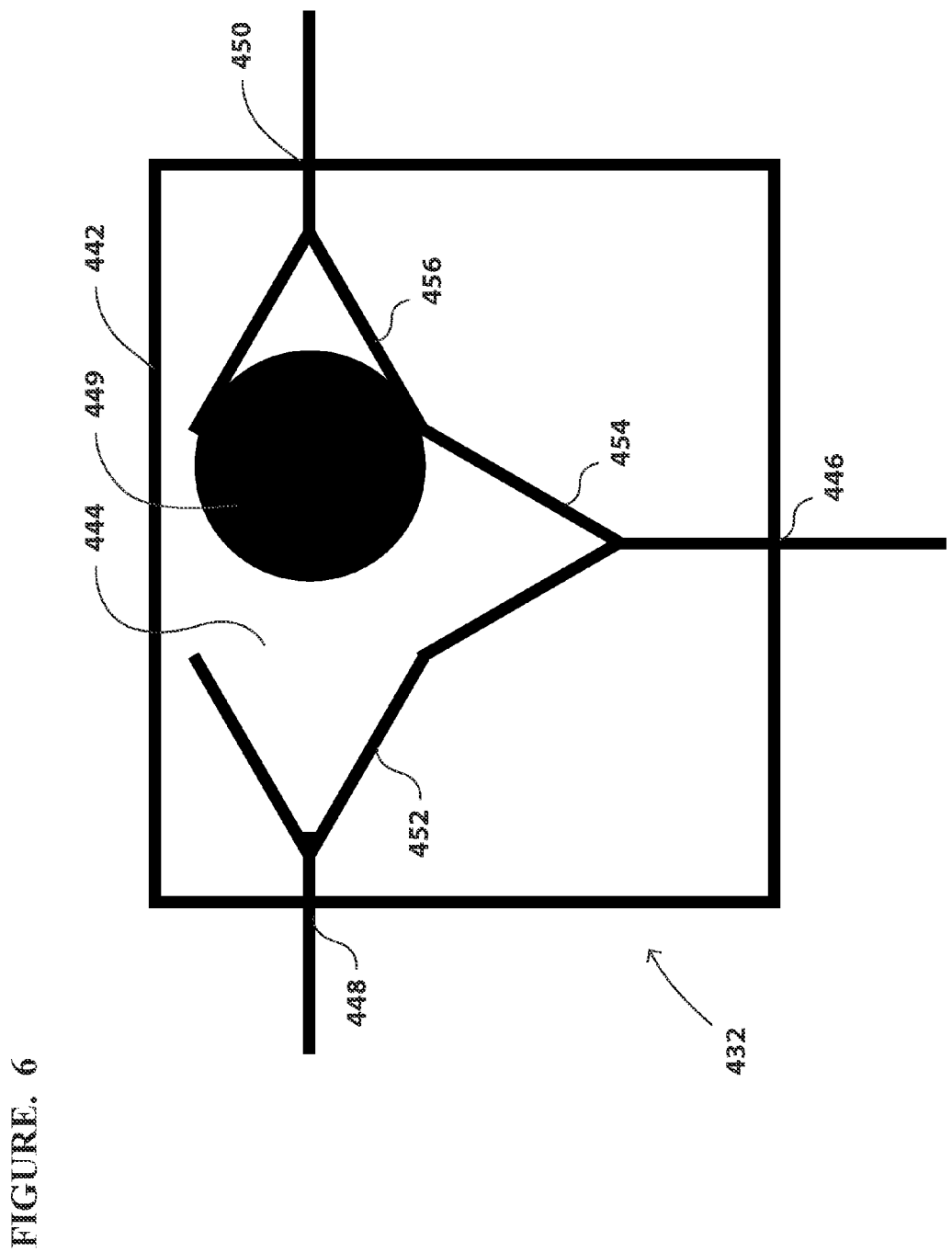
FIG. 6 is an magnified view of the inlet valve of the fluid separation device in FIG. 4.

With reference to FIG. 6, the composition of inlet valve 432 will now be described. Inlet valve 432 has a housing 442 defining a volume 444 therein. The housing 442 has three apertures, namely inlet aperture 446 and first and second outlet apertures 448, 450 adapted to transfer air into and out of volume 444. The valve 432 also has a rubber ball 449 for restricting the flow of air through at least one of the apertures 446, 448, 450 at a time, and allowing air to transfer between the other apertures. As is clear from FIG. 6 the rubber ball 449 is freely movable within volume 444.

The valve 432 operates by using air pressure differentials between volume 444 and the apertures 446, 448, 450 to induce forces on the rubber ball 449.

The valve 432 also has ports 452, 454, 456 respectively in communication with apertures 448, 446, 450 for receiving the rubber ball 449. The ports 452, 454, 456 each having a circular cross section, complimentary to that of the rubber ball 449. Alternatively, however, the apertures 446, 448, 450 themselves may have a shape complimentary with that of the rubber ball 449 so as to receive the rubber ball therewithin without the use of a port 452, 454, 456.

The operation of inlet valve 432 in FIG. 6 will now be described with further reference to FIG. 4.

FIG. 4 illustrates a fluid separation device 400 into which air is received through inlet aperture 406, passes through inlet valve 432 into drying column 422 and through outlet valve 434. Air flowing from the outlet valve 434 then flows partially through outlet aperture 408, and partially through the control orifice 430 into drying column 424 and out of purge air outlet 412 and through exhaust valve 472.

The operation of inlet valve 432 is controlled by exhaust valves 472, 474 wherein exhaust valve 472 is shown to be open and exhaust valve 474 is shown to be closed. The outlet valve 434 itself is controlled in a similar way to that of a shuttle valve, by controlling the flow of air through purge air outlets 410, 412 using exhaust valves 472, 474. Referring back to FIG. 6, when air is pumped into the inlet valve 432 through aperture 446, which aperture 448, 450 air flows out of depends on the position of the rubber ball 449. In FIG. 4, the configuration of outlet valve 434 and control orifices 428, 430 cause a back flow of air through drying column 424 and out of purge air outlet 412 and through exhaust valve 472. This back flow of air causes air in volume 444 of the inlet valve 432 to be sucked through aperture 450. Air flowing out of aperture 446 and into aperture 450 exerts forces on the rubber ball 449 and effectively 'blows it' such that it moves into the space defined by port 456 thereby blocking aperture 450. While a backflow of air is being pumped through drying column 424 the rubber ball 449 will stay in this blocking position due to the pressure differential between the air in the volume 444 within the inlet valve 432 and the air in aperture 450 which is in communication with the air in the drying column 424 so experiencing a back flow of air therethrough.

The rubber ball 449 will initially be partially blown towards aperture 448 because of the flow of air therethrough. However, the suction force exerted by the air in aperture 450 on the rubber ball 449 is stronger than the suction force exerted by air flowing through aperture 448 thereby causing the rubber ball 449 to block aperture 450 as described.

By closing exhaust valve 472 and opening exhaust valve 474 the configuration of the outlet valve 434 is reversed such that the rubber ball 449 blocks aperture 448 in a similar way to the way in which it blocks aperture 450 as previously described. In such a position air is directed from inlet aperture 406, through inlet valve 432 and into drying column 424 before passing through outlet valve 434. Air flowing from the outlet valve 434 partially flows back through drying column 422, through outlet 410 and through exhaust valve 474, and also partially flows out of the outlet aperture 408.

If air is stopped from being pumped into inlet aperture 406 of the fluid separation device 400, air will flow back through both drying columns 422 and 424 because of the high pressure of air there within. In such a situation, air will flow into inlet valve 432 through apertures 448, 450 and will blow the rubber ball 449 into the space defined by port 454 thereby blocking aperture 446 and preventing the flow of air therethrough. This allows any components downstream from inlet valve 432 to remain at high air pressure even when there is no flow of air into inlet aperture 406.

Figure 7:
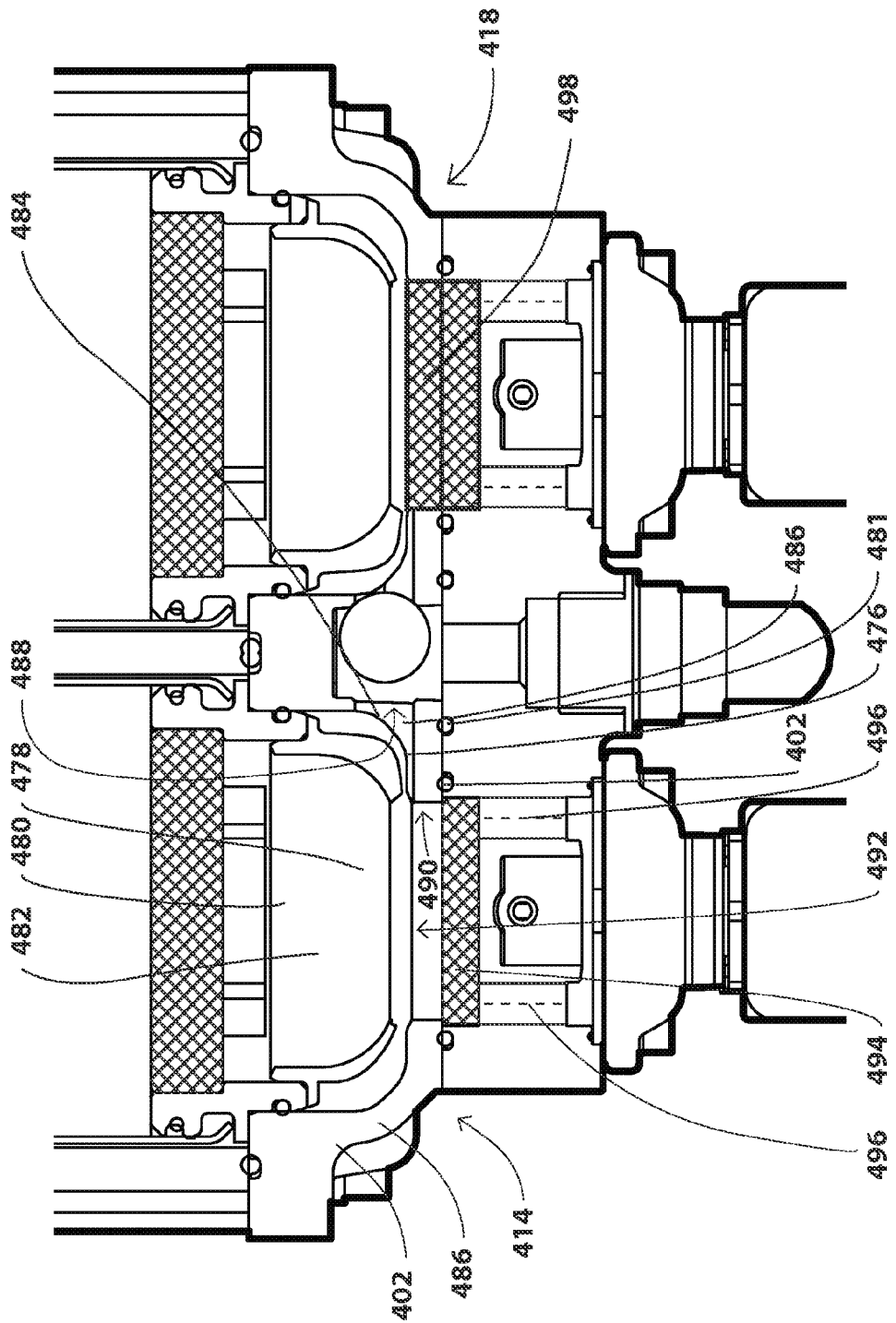
FIG. 7 is a magnified view of the inlet filters of the fluid separation device in FIG. 5.

The process through which the filters 414, 418 in FIG. 4 remove liquid water from a stream of air will now be described in detail. Referring to FIG. 7, the filters 414, 418 each have a filter inlet portion 476 defining a first volume 478 and a filter outlet portion 480 defining a second volume 482. The second volume portion 482 is positioned within the first volume 478 of the filter inlet portion 476. The internal surface 486 of the housing 402 and the external surface 484 of the filter inlet portion 476 provides that the volume defined by the space between the internal surface 486 of the housing 402 and the external surface 484 of the filter inlet portion 476, herein referred to as the third volume 481, is annular. Ideally the second volume 482 defined within the filter outlet portion 480 is cylindrical.

The filter inlet portion 476 defines two apertures 488, 490 wherein air is adapted to flow into aperture 488 and out of aperture 490. The distance between the inner surface 486 of the housing 402 and the external surface 484 of the filter inlet portion 476 decreases between the position of the aperture 488 for receiving air and the aperture 490 for removing air from the third volume 481. This ensures that air flowing into the third volume 481 through aperture 488 increases in speed before exiting the third volume 481 through aperture 490.

The position of aperture 490 is such that air exiting the third volume 481 is directed away from the aperture 492 of the filter outlet portion 480 which is in communication with the second volume 482.

As air leaves the third volume 481 through aperture 490, it slows down and changes direction such that it flows through aperture 492 and into the second volume 482 within filter outlet portion 480. The air will be able to change direction more readily than any liquid impurity in the air e.g. water droplets, and the momentum of any liquid particles is such that they do not change direction fast enough so as to pass into the second volume 482 through aperture 492. They instead, after passing through aperture 490, out of the third volume 481, continue in a direction substantially away from the aperture 492 in the filter outlet portion 480 and contact a porous body portion 494 which retains the liquid particles such that they fall under gravity into a turbulence free quiet zone 496. Air with no liquid impurity is then able to flow into and subsequently out of the second volume 482 within the filter output portion 480.

The notable difference between filters 414 and 418 in FIG. 7 is that filter 418 is fitted with an additional porous body portion 498. In such an embodiment, air leaving the third volume 481 through aperture 490 must flow through the additional body portion 498 before flowing into the second volume 482 through aperture 492. Both, either one, or neither of the filters 414, 418 may be fitted with such an additional porous body portion 498 and both such embodiments have been included in FIG. 7 for illustrative purposes only.

The fluid separation device 400 illustrated in FIG. 4 may also be fitted with a fluid disposal device (not shown) for disposing of liquid water in the quiet zone 496 so removed from air by the inlet filters 414, 418. Such a fluid disposal device has an electric heater (not shown) for heating a heat element, and liquid water transfer means (not shown) for transferring liquid water from the inlet filters 414, 418 to the heat element e.g. by simply piping it away. Heat is then absorbed by the liquid water, causing it to evaporate back into the atmosphere. A fluid disposal device (not shown) has an aperture (not shown) through which gaseous water, so evaporated by the heat element, may pass back into the atmosphere. A fluid disposal device (not shown) may also be fitted with a fan for blowing the gaseous evaporated water away from the fluid separation device 400 and into the atmosphere. The electric heater (not shown) of such a fluid disposal device may only be activated intermittently thereby requiring the use of a vessel (not shown) for storing liquid water to be evaporated while the heater is switched off.

Figure 8:
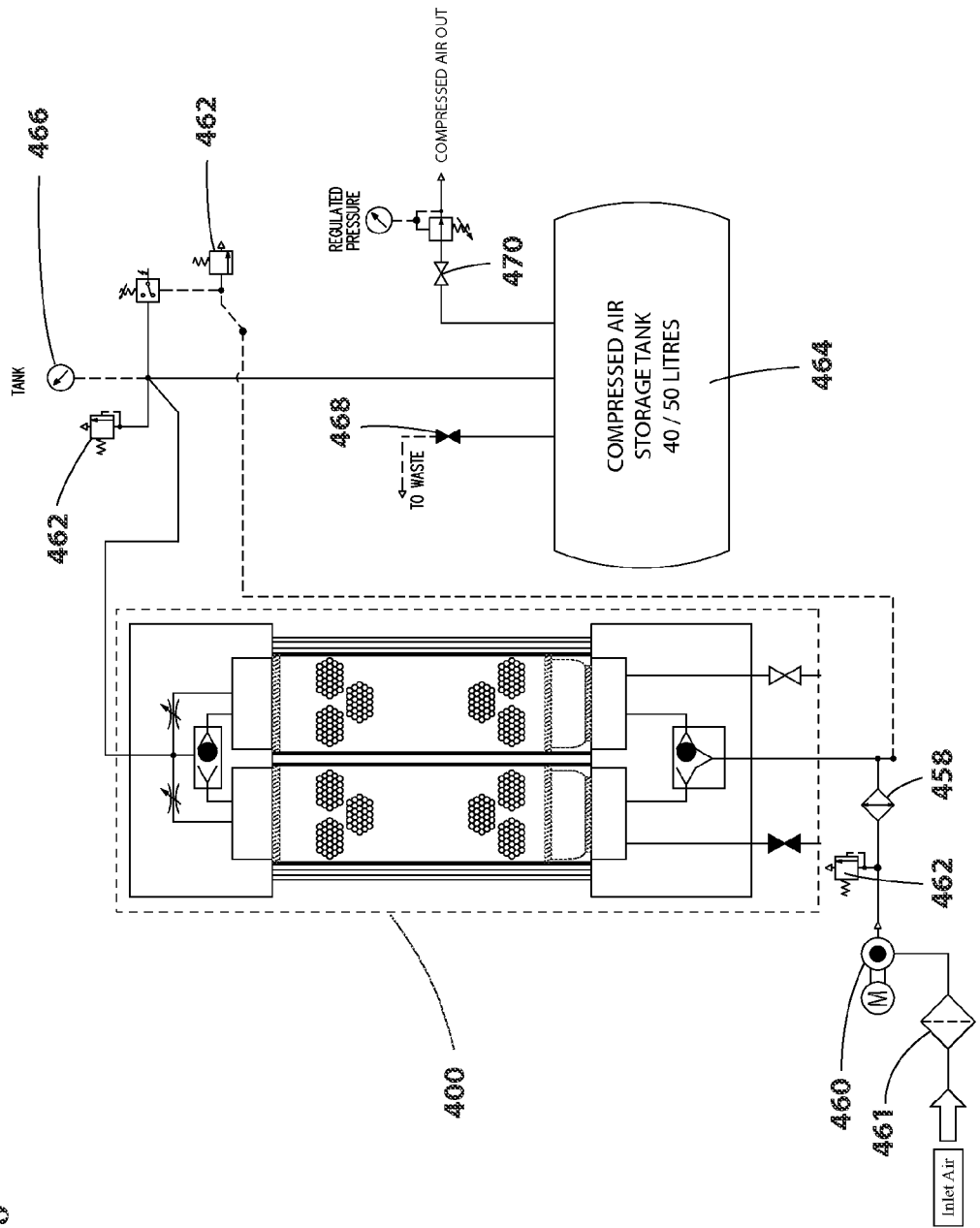
FIG. 8 is a schematic diagram of an air drying system including the fluid separation device of FIG. 4.

The fluid separation device 400 illustrated in FIG. 4 may be incorporated into a pressurized air drying system such as that illustrated in FIG. 8. The cartridge 421 which is adapted to remove water from air input into the air drying system is removably mounted in the fluid separation device 400 such that perishable components of the air drying system i.e. filters 414, 416, 418, 420 and drying columns 422, 424 may be easily and quickly replaced. The cartridge 421 may also be designed to ensure that it cannot be fitted incorrectly into such an air drying system, by way of an extended flange which cannot pass into the system.

How the fluid separation device 400 in FIG. 4, for use in the compressed air drying system in FIG. 8, purifies compressed air will now be described.

FIG. 8 illustrates a source of inlet air being drawn through a filter 461, before being compressed by compressor 460, passing a safety valve 462 and being cooled by a cooler 458 thereby causing the formation of liquid water condensation. Such subsequently cooled compressed air and liquid condensate are pumped into fluid separation device 400 through inlet valve 432. In FIGS. 4 and 8, the configuration of the outlet valve 434 and exhaust valves 472, 474 are such so as to control the inlet valve 432 to direct air input into the inlet valve 432 towards dryer column 422.

Before entering drying column 422, air is first pumped through filter 414 where the liquid water condensate is separated from the air flow. Such separated liquid water condensate is subsequently drained under gravity to a quiet zone 496 within volume 417 of the cartridge 421 of the fluid separation device 400. A screen of porous material 439 may be fitted within the housing 419 of the cartridge 421 to ensure that energy is dissipated thereby allowing liquid water so separated from an air flow to remain so separated.

After air has flowed through filter 414 it now flows through drying column 422, which contains a bed of adsorbent desiccant beads, so that only water vapour laden air enters this adsorption stage of the fluid separation device 400. The space for the adsorbent material is made to have a constant uninterrupted bore and flat ends which ensure optimum packing density being achieved. Water vapour is adsorbed by the desiccant as air flows through the drying column 422, thereby drying the air.

After passing through the drying column 422, air then flows through filter 416 which removes any fragments of desiccant in the air flow. Air is then passed into outlet valve 434 before partially being directed out of outlet aperture 408, and partially directed through control orifice 430.

Air which is pumped out of outlet aperture 408 has been dried and is pumped into a storage tank 464. The air pressure in the storage tank may be read by pressure gauge 466. Air may be either pumped out of the storage tank via exhaust valve 468, shown to be closed, into the atmosphere, or via application valve 470, shown to be open, into a component of apparatus requiring the use of dry compressed air.

Air which is pumped through control orifice 430 is directed through filter 420 into drying column 424, through filter 418 and out of the fluid separation device 400 via aperture 412 and through exhaust valve 472. Exhaust valve 474 remains closed while drying column 422 is being used to dry air.

As an increasing amount of water is adsorbed by the desiccant beads in drying column 422, the adsorbing power of the desiccant beads reduces. This is the reason why the drying columns are purged. In the specific example of the fluid separation device in FIG. 4 for use in the compressed air drying system in FIG. 8, when drying column 422 is deemed to be saturated, the configurations of the outlet valve 434 and exhaust valves 472, 474 are reversed so as to control inlet valve 432 to direct inlet air into drying column 424, as previously described. Exhaust valve 472 closes and exhaust valve 474 is opened. Such a configuration of valves causes inlet air to be directed into drying column 424, and back through drying column 422. Such a back flow of air through drying column 422 purges the filters 414, 416 and desiccant beads within drying column 422, thereby regenerating them so as to dry more air when the air flow in the fluid separation device is again reversed.

It should be noted that before controlling the inlet valve 432 so as to effect drying column change over, the exhaust valve of the drying column experiencing a back flow of air is initially closed so as to increase the air pressure within that drying column before the exhaust valve of the drying column being used to dry air is opened thereby effecting change over. This is performed so as not to shock the desiccant beads within the drying columns on change over.

The fluid separation device 400 may be fitted with a flow control device e.g. sonic nozzle, for restricting the volumetric flow of air therethrough.

This is particularly important when the fluid separation device 400 is initially pressurised because, without such a flow control device, a high volumetric flow of air would be experienced through the desiccant beads in drying columns 422, 424 until both the receiver of dry air and the fluid separation device 400 are fully pressurised. This would place significantly more water loading on the desiccant beads which could not be regenerated by a set regeneration cycle.

Since the frequency of change over from one drying column to the other is short (typically 2 minutes) the amount of condensate collected by either filter 414 or 418 within such a time is normally about 5-10 ml and is held in a quiet zone 496, which has a matching capacity, within the volume 417 of the cartridge 421 of the fluid separation device 400.

External filters typically discharge larger volumes of condensate (50-100 ml) less frequently. The volume of condensate discharged in the fluid separation device 400 is small and frequent.

This more frequent discharge of smaller volumes of condensate has the benefit of removing the need for a liquid condensate drainage system to be fitted to the inlet air filters 414, 418.

Figure 9:
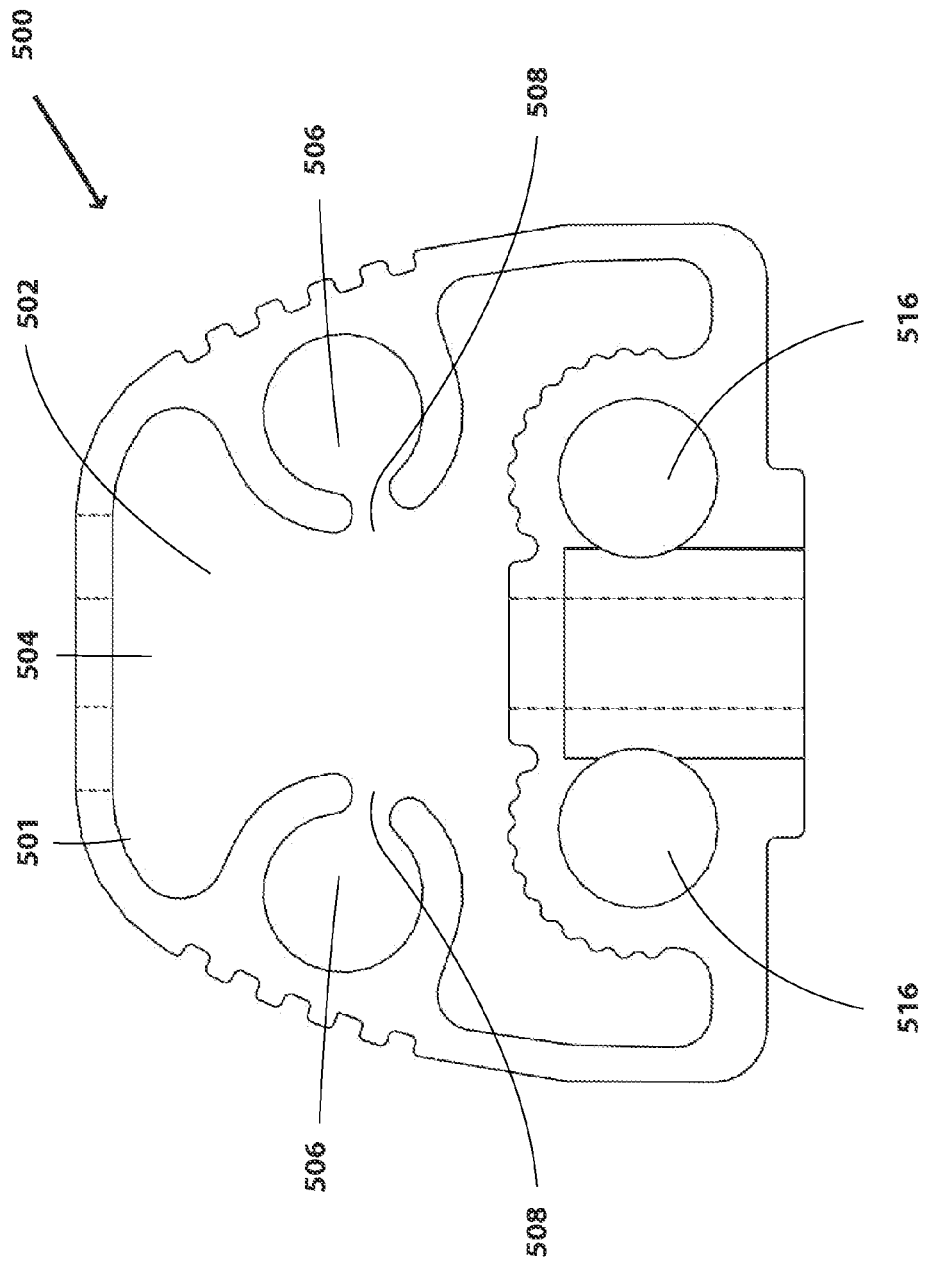
FIG. 9 is a cross sectional view of an exhaust silencer according to an aspect of the present invention.
Figure 10:
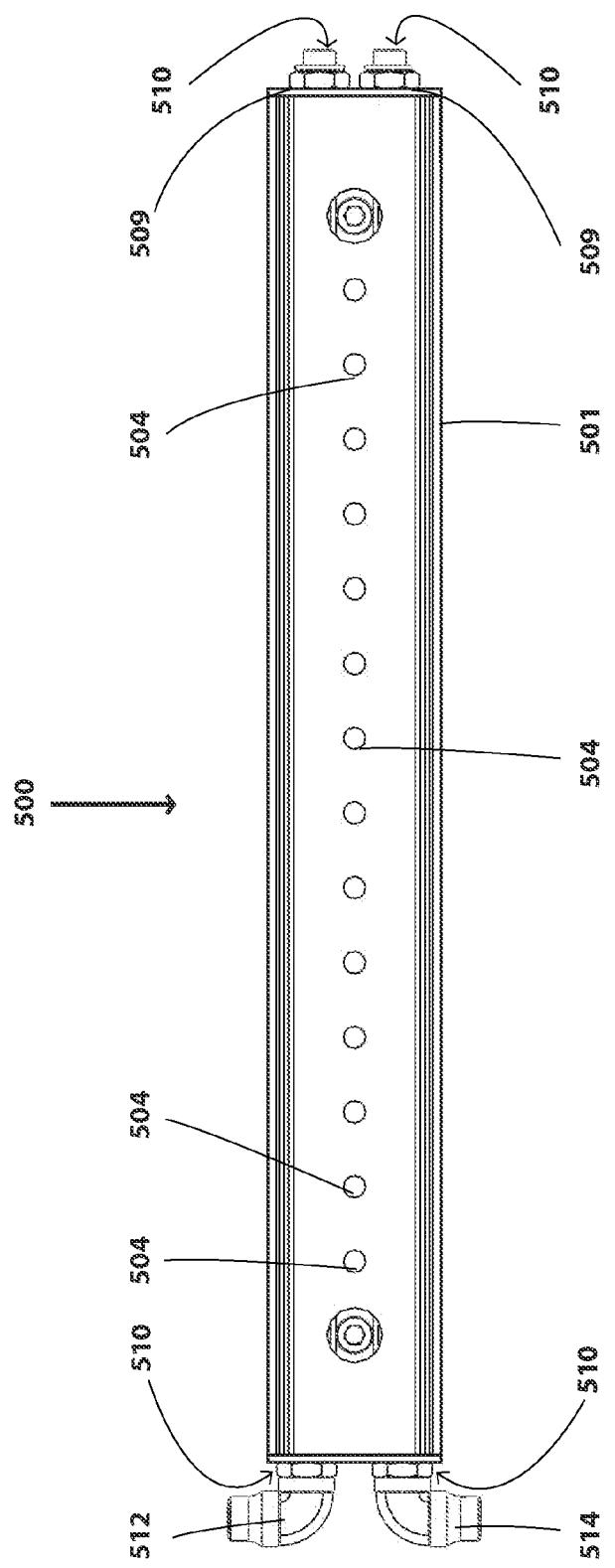
FIG. 10 is a top view of the exhaust silencer in FIG. 9.
Figure 11:
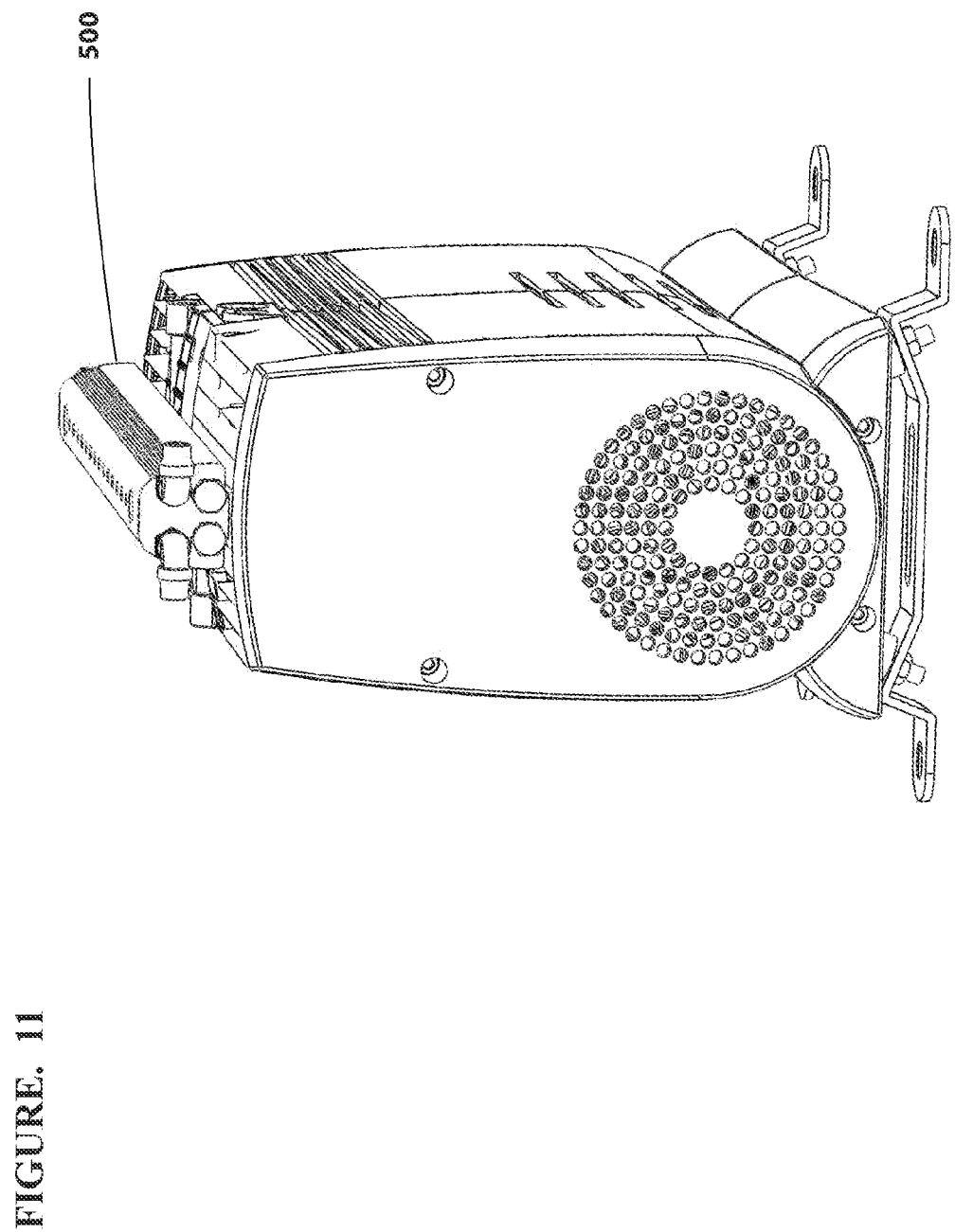
FIG. 11 is a perspective view of the exhaust silencer in FIGS. 10 and 11 connected to an air compressor.

A fluid disposal device which may be used in conjunction with the fluid separation device 400 also acts as a silencer for minimizing the noise produced when liquid water in the quiet zone 496 is disposed of With reference to FIG. 9, such an exhaust silencer 500 has a body or housing 501 which defines a first body portion within which is a first volume in the form of an expansion chamber 502. The expansion chamber 502 is in fluid communication with the atmosphere via one or more first apertures 504. The housing 501 also defines one or more second body portions in the form of first channels 506, which defines a second volume. The expansion chamber 502 is also in fluid communication with the first channels 506 via one or more second apertures 508. Each channel 506 also has one or more inputs 510 which correspond to apertures in the exterior surface of the housing 501, see FIG. 10, for receiving moving fluid. This fluid, which is the output from the fluid separation device 400, will include air and water vapour flowing from the exhaust valves 472, 474 and liquid water from the quiet zones 496. These fluids are blown through the exhaust valves 472, 474 when the respective drying columns 424, 422 are purged. The exhaust valves 472, 474 may be connected directly to the inputs 510 or by entry apertures 512, 514. Inputs 510 through which fluid flow is to be restricted may be blocked using closure members 509.

The housing 501 of the exhaust silencer 500 also defines one or more third body portions in the form of second channels 516. These channels define a third volume which is not in fluid communication with the expansion chamber 502 and allow fluid to flow therethrough. When the exhaust silencer 500 is used in the air drying system in FIG. 8, hot air flowing between the compressor 460 and after cooler 458 is made to flow through the second channels 516. The housing 501, which is preferably made of a thermally conductive material such as a metal, for example aluminium, allows heat from the hot compressed air flowing through the second channels 516 to be transferred via conduction to heat the internal chambers of the exhaust silencer then passing transferring to liquid water being blown into the expansion chamber 502. This causes the liquid water on absorbing such heat to evaporate and exit the exhaust silencer 500 via the first aperture 504 along with any purged air and water vapour. An external surface of one or more second channel 516, corresponding to an internal surface of the housing 501, may be partially ribbed so as to maximise the efficiency of heat transfer to liquid water within the expansion chamber 502.

Utilising hot air from a compressor 460 in this way will also improve the efficiency of the air drying system in FIG. 8 by reducing the inlet temperature of the compressed air into the fluid separation device 400 leading to improved dew point performance as the exhaust silencer 500 acts in part as a pre cooler to the after cooler 458 which is aided by movement of fluid from within the exhaust silencer 500 and also the cooling effect of water evaporation.

Furthermore, it is the orientation of the first and second apertures 504, 508 which allows the exhaust silencer 500 to minimize the noise produced when disposing of liquid water from within the quiet zones 496. The first and second apertures 504, 508 are arranged such that fluid moves in a first direction on passing from within the first channels 506 to the expansion chamber 502 through the second apertures 508, slows down and moves in a second direction, different from the first direction, as it passes through the expansion chamber 502 into the atmosphere via the first aperture 504. It will be appreciated by persons skilled in the art that the above embodiments have been described by way of example only and not in any limitative sense, and that various alterations and modifications are possible without departure from the scope of the invention as defined by the appended claims. For example, an external surface of the housing 501 of the exhaust silencer 500 may also be partially ribbed. It is also the case that the exhaust silencer would work by simply placing the silencer on top of the compressor adjacent a hot surface, such as that shown. Alternatively, only the hot exhaust gases could be used to heat the exhaust silencer. However, the embodiment shown in the drawings utilises both of these heat sources.

What is claimed is:

1. A fluid separation device for separating water from a stream of fluid, the device comprising:
   a housing defining a first volume, said housing having at least one first aperture in communication with said first volume, said first volume and said first aperture adapted to have at least one stream of at least one fluid flowing therethrough;
   at least one fluid transfer device for increasing a velocity of said fluid;
   at least one liquid catching device, located adjacent said fluid transfer device, for catching droplets of water; and
   at least one water separation medium contained at least partially within said first volume for separating at least water vapor from said first fluid,
   wherein said fluid moves in a first direction on exiting said fluid transfer device and then slows down and moves in a second direction, different from said first direction, and said catching device is oriented in a direction parallel to said first direction and
   wherein said device operates in a drying mode in which said fluid flows through said fluid transfer device then into said separation medium and in a purge mode in which said fluid flows into said separation medium and then flows through said liquid catching device to exhaust said separated liquid water.

2. A fluid separation device according to claim 1, wherein said liquid catching device is adapted to at least partially engage said first aperture.

3. A fluid separation device according to claim 1, further comprising:
   at least one second aperture in said housing in communication with said first volume within said housing; and
   at least one second filter contained at least partially within said first volume for separating at least one impurity from said fluid stream.

4. A fluid separation device according to claim 3, wherein said second filter is located adjacent said second aperture.

5. A fluid separation device according to claim 1, further comprising:
   at least one heat generating device for heating at least one body portion; and
   at least one impurity transfer device for transferring said impurity so separated from said fluid stream to said at least one heat generating device in order to evaporate said impurity back to atmosphere.

6. A fluid separation device according to claim 5, further comprising at least one vessel for collecting said impurity so separated from said fluid stream.

7. A fluid separation device according to claim 5, wherein said at least one heat generating device is an electric heater.

8. A fluid separation device according to claim 5, further comprising at least one fan for blowing said evaporated impurity into the atmosphere.

9. A removable cartridge for use in a pressurized air drying system, the cartridge comprising the features of claim 1, wherein said cartridge is adapted to remove water from air input into the cartridge from said pressurized air drying system.

* * * * *